UNITED STATES PATENT OFFICE 2,453,570

PLASTICIZED POLYVINYL ACETAL RESIN

Max O. Debacher, Springfield, Mass., assignor to Monsanto Chemical Company, St. Louis, Mo., a corporation of Delaware No Drawing. Application June 30, 1945,
Serial No. 602,666

18 Claims. (Cl. 260—31.6)

This invention relates to improved compositions of matter comprising polyvinyl acetal resins.

Polyvinyl acetal resin compositions have many advantageous characteristics as is known to those skilled in the art. However, for certain purposes the use of such compositions has been restricted to some extent, thus making it desirable to effect improvements in certain properties.

It is an object of this invention to provide improved polyvinyl acetal resin compositions. A particular object is to provide thermosetting polyvinyl acetal resin compositions having improved characteristics.

According to the present invention, improved compositions are prepared by combining polyvinyl acetal resins, sulfur and partial esters of polyhydric alcohols with poly-unsaturated aliphatic acids. On heat treatment these new compositions are converted into products unexpectedly resistant to solvents and having other valuable and unobvious characteristics.

The following examples illustrate the improved compositions of the present invention, but are not limitative thereof. Where parts are specified, the parts are by weight.

The polyvinyl butyraldehyde acetal resin employed in the examples is prepared from a polyvinyl acetate of such a degree of polymerization that a one molar benzene solution possesses a viscosity of substantially 50–55 centipoises at 20° C. The polyvinyl butyraldehyde acetal resin may be considered to be made up on a weight basis of 16–20% hydroxyl groups calculated as polyvinyl alcohol, less than 3% acetate groups calculated as polyvinyl acetate and the balance substantially butyraldehyde acetal.

The phenolic resin employed in the examples in Table I is a thermosetting resin made by reacting phenol with formaldehyde under alkaline conditions.

In all cases where a cured sample is specified, the curing is carried out at about 130–135° C.

The tensile strength and elongation values given in the examples are obtained by means of a Scott tilting table type testing machine (IP-4), with an initial jaw separation of 0.5 inch and a constant rate of load using a 50-pound weight and a speed of 200 R. P. M. The test specimen employed in each case is a 0.020 inch thick sheet which is 0.5 inch in width and is previously conditioned for 48 hours at 25° C. and at a relative humidity of 50%. The sheets are prepared by pressing the compositions into the form of a block for 20–30 minutes at a platen temperature of about 140–150° C. and then skiving sheets therefrom of the desired thickness.

The swelling test is carried out by immersing sheets 0.020 inch thick in ethanol for one hour. The values given are the increases in width in per cent as a result of this treatment.

The curing loss values are obtained by measuring the percentage loss in weight of a 0.020 inch thick sheet on heating for one hour at 130–135° C. while spread out on polished metal plates.

The water absorption values are obtained by measuring the increase in weight on immersion of cured sheets 0.020 inch in thickness in water at room temperature for 48 hours. From the difference in weights of dry samples before and after immersion in water are calculated the percentage loss due to extraction.

The aviation gasoline extraction values are obtained by immersing sheets 0.020 inch in thickness in #813 fuel for 20 hours at 25° C. and determining the percentage loss in weight as a result of this treatment.

The proportions of ingredients given in the examples in Table I are based on a mixture of 100 parts polyvinyl butyraldehyde acetal resin and 80 parts of the monoester of glycerin and "Isoline" acids. The several ingredients may be mixed, for example, in the following manner. The polyvinyl acetal resin and the glyceryl ester are mixed in a Banbury mixer to form a homogeneous composition. The resulting composition is placed on constant speed milling rolls heated to a temperature of 105–120° C. and thereafter the sulfur and/or phenolic resin are added. When desired the phenolic resin and/or sulfur may be incorporated with the plasticizer and polyvinyl acetal resin in the Banbury mixer.

The dehydrated castor oil acids used in making the glyceryl ester are marketed by the Woburn Chemical Co. under the trade name "Isoline."

Table I

| Example No | I | II | III | IV | V | VI | VII |
|---|---|---|---|---|---|---|---|
| Sulfur, parts | | 0.1 | 0.4 | 5.0 | 26.0 | 26.0 | 5.0 |
| Phenolic Resin, parts | | | | | | 5.0 | 5.0 |
| Tensile Strength, lbs./sq. inch: | | | | | | | |
| Uncured | 930 | 1,290 | 990 | 920 | 1,240 | 1,210 | 1,430 |
| Cured 15 min | | 650 | 540 | 480 | 1,030 | 1,130 | 1,200 |
| Cured 30 min | | 530 | 580 | 480 | 860 | 1,090 | 1,090 |
| Cured 60 min | | 490 | 730 | 590 | 530 | 780 | 600 |
| Percent Elongation: | | | | | | | |
| Uncured | 380 | 420 | 180 | 170 | 400 | 400 | 400 |
| Cured 15 min | | 350 | 100 | 90 | 370 | 380 | 350 |
| Cured 30 min | | 320 | 80 | 80 | 360 | 360 | 350 |
| Cured 60 min | | 255 | 80 | 70 | 230 | 300 | 260 |
| Percent Swelling in Ethanol: | | | | | | | |
| Uncured | Sol. | Sol. | 31 | 38 | Sol. | Sol. | Sol. |
| Cured 15 min | | 50 | 25 | 25 | 100 | very soft | 100+ |
| Cured 30 min | | 38 | 19 | 13 | 38 | 60 | 88 |
| Cured 60 min | | 38 | 19 | 13 | 38 | 40 | 50 |
| Percent Curing Loss | | 4.5 | 7.3 | 10.3 | 9.1 | 5.2 | 3.3 |
| Percent Water Absorption [1] | 17.2 | 4.6 | 2.4 | 2.0 | 4.0 | 7.8 | 5.6 |
| Percent Loss on Water Immersion [1] | 3.1 | 0.0 | 0.0 | 0.0 | 0.1 | 0.5 | 0.1 |
| Percent Loss on Aviation Gasoline Extraction [1] | 3.46 | 0.46 | 0.0 | 0.43 | 12.2 | 26.2 | 22.4 |

[1] Previously heated 1 hour at 130–135° C. with one surface exposed.

As illustrated by the foregoing specific examples, the compositions of the invention are characterized by numerous valuable and unobvious properties. Particularly noteworthy is the increased resistance to solvents after heat treatment as evidenced by decreased swelling of the plastic material on immersion in a solvent for the non-heat-treated material. In addition, the compositions of the invention are characterized by a greatly decreased absorption of water on immersion therein in contrast to the results obtained with similar compositions that do not contain sulfur. Of similar significance is the decreased amount of material leached from the heat treated plastic on immersion in water. A particularly outstanding advantage of the compositions is their resistance to extraction on immersion in gasoline and other hydrocarbon fuels, especially when the sulfur content is between 0.3 and 10 parts for every 100 parts of polyvinyl acetal resin. Even without heat treatment additional to that necessary in forming sheets from the compositions of the invention, the compositions exhibit higher tensile strengths and greater percentages of elongation when the sulfur content is either between 0.05 and 0.2 part or between 20 and 30 parts for every 100 parts of polyvinyl acetal resin. However, compositions containing 0.3 to 10 parts of sulfur for every 100 parts of polyvinyl acetal resin are of outstanding value for many purposes as is clearly evidenced from the examples. Thus, such compositions are outstanding in their resistance to either water or solvents, and, as pointed out above, are particularly resistant to extraction with gasoline.

The examples in Table II further demonstrate the advantages of the invention. In these examples, the polyvinyl acetal resin is the same as that used in the examples in Table I. The swelling test is conducted in the same manner as in the previous examples. The phenolic resin is an oil-soluble resin made by reacting para-tertiary butyl phenol with formaldehyde.

the invention include substantially higher tensile strength.

In general, the products of the invention as illustrated by the examples in Tables I and II are characterized by an unusually high degree of elasticity and flexibility, even at low temperatures, e. g. 0° F.

According to this invention the partial esters employed are partial esters of non-resinous polyhydric alcohols with unsaturated aliphatic acids especially those having more than 9 but, preferably from 10 to 20 carbon atoms.

According to a particular embodiment of this invention, the esters employed are glyceryl monoesters of polyunsaturated aliphatic acids having more than 9 and preferably from 10–20 carbon atoms.

In an especially valuable embodiment of this invention, the partial ester employed is a glyceryl monoester of a poly-olefinic unsaturated aliphatic acid containing from 17 to 19 carbon atoms.

Polyvinyl acetal resins may be prepared, for example, by hydrolyzing a polyvinyl ester, for example polyvinyl acetate, and then reacting the resulting hydrolysis product with an aldehyde. These resins may contain a certain proportion of ester and hydroxyl groups in addition to the acetal groups. U. S. patent to Morrison et al. Re. 20,430, dated June 20, 1937, illustrates suitable methods for preparing such resins. The polyvinyl acetal resins may be made from various aldehydes or mixtures thereof, or even from ketones containing an active carbonyl group. Thus, formaldehyde, acetaldehyde, propionaldehyde, butyraldehyde, valeraldehyde, hexaldehyde, heptaldehyde, benzaldehyde, cyclohexanone and the like and mixtures thereof may be employed. In general, polyvinyl acetal resins made from saturated lower aliphatic aldehydes are preferred and, in particular, polyvinyl acetal resins made with saturated aliphatic aldehydes containing less than 6 carbon atoms and especially those made Table II

| Example | | VIII | IX | X | XI | XII | XIII | XIV | XV | XVI |
|---|---|---|---|---|---|---|---|---|---|---|
| Polyvinyl butyraldehyde acetal resin | | 100 | 100 | 100 | 100 | 100 | 100 | 100 | 100 | 100 |
| Glyceryl diester of linseed oil acids | parts | 45 | | | | | 45 | | | |
| Glyceryl monoester of "Isoline" acids | do | | 45 | | | | | 45 | | |
| Glyceryl monoricinoleate | do | | | 45 | | | | | | |
| Glyceryl monolaurate | do | | | | 45 | | | | | |
| Glyceryl monoester of coconut oil acids | do | | | | | 45 | | | | |
| Glyceryl monoester of linseed acids | do | | | | | | | | 45 | 90 |
| Butyl ricinoleate | do | 45 | 45 | 45 | 45 | 45 | 45 | 45 | 45 | |
| Sulfur | do | 2 | 2 | 2 | 2 | 2 | 2 | 2 | 2 | 2 |
| Zinc Oxide | do | 20 | 20 | 20 | 20 | 20 | 20 | 20 | 20 | 20 |
| Stearic acid | do | 1 | 1 | 1 | 1 | 1 | 1 | 1 | 1 | 1 |
| Phenolic resin | do | | | | | | 10 | 10 | | 10 |
| Percent Swelling in ethanol | | 65 | 100 | (¹) | (¹) | (¹) | 40 | 45 | | |
| Tensile Strength, lbs./sq. in.: | | | | | | | | | | |
| Uncured | | 1,600 | 1,520 | 1,390 | 830 | 960 | 2,000 | 1,500 | | |
| Cured | | 1,040 | 1,150 | | | | 1,550 | 1,580 | 1,250 | 1,480 |
| Percent elongation: | | | | | | | | | | |
| Uncured | | 440 | 540 | 560 | 600 | 580 | 440 | 510 | | |
| Cured | | 370 | 510 | | | | 420 | 460 | 480 | 480 |

¹ Soluble.

The unexpected nature of the products of the invention as illustrated by Examples VIII, IX, XIII, XIV, XV and XVI in Table II is clearly evident by comparison with the products described in Examples X, XI and XII. In the latter examples, glyceryl esters of saturated or mono-unsaturated acids are used and the products after heat treatment are soluble in ethanol or other solvents for the uncured compositions. In contrast, the products of Examples VIII, IX, XIII, XIV, XV and XVI are insoluble in ethanol and are only swelled as a result of immersion therein. Other advantages of the products of with butyraldehyde are preferred. When the polyvinyl acetal resins contain ester groups, the nature of the ester groups may be substantially varied, but are preferably residues of saturated lower aliphatic acids such as acetic propionic acid and butyric acids. The polyvinyl esters from which the polyvinyl acetal resins are derived may vary substantially in degree of polymerization as evidenced by the viscosity of 1-molar benzene solutions which may vary, for example, from 5–75 centipoises at 20° C.

The polyvinyl acetal resins contemplated according to the invention have at least about 30% of the ester groups in the original polyvinyl ester replaced by acetal groups and do not have more than about 50% of said ester groups replaced by hydroxyl groups.

According to one embodiment of this invention, the polyvinyl acetal resins employed contain, on a weight basis, at least 5% hydroxyl groups calculated as polyvinyl alcohol, and preferably, from 5 to 25% hydroxyl groups. These resins also contain from 0 to 30% ester groups calculated as polyvinyl ester, the ester groups being preferably acetate.

According to one embodiment of this invention, when the acetal groups are butyraldehyde acetal, the resins employed may be considered to be made up, on a weight basis, of 12–22% hydroxyl groups calculated as polyvinyl alcohol and from 15–30% acetate groups calculated as polyvinyl acetate and the balance substantially acetal. According to another embodiment when the acetal groups are butyraldehyde acetal, the resins employed may be considered to be made up, on a weight basis, of 16–20% hydroxyl groups calculated as polyvinyl alcohol, less than 3% acetate groups calculated as polyvinyl acetate and the balance substantially butyraldehyde acetal. According to another embodiment, when the acetal groups are butyraldehyde acetal, the resins employed may be considered to be made up, on a weight basis, of 5–13% hydroxyl groups calculated as polyvinyl alcohol, less than 3% acetate groups calculated as polyvinyl acetate and the balance substantially butyraldehyde acetal. Usually, the polyvinyl butyraldehyde acetal resins contain 10–20% hydroxyl groups on a weight basis, calculated as polyvinyl alcohol.

According to one embodiment of this invention, when the acetal groups are acetaldehyde acetal, the polyvinyl acetal resin employed may be considered to be made up, on a weight basis, of 5–15% hydroxyl groups calculated as polyvinyl alcohol, 15–20% acetate groups calculated as polyvinyl acetate and the balance substantially acetaldehyde acetal.

According to one embodiment of this invention, when the acetal is formaldehyde acetal, the polyvinyl acetal resin may be considered to be made up, on a weight basis, of 5–10% hydroxyl groups calculated as polyvinyl alcohol, 10–15% acetate groups calculated as polyvinyl acetate and the balance substantially formaldehyde acetal.

An example of a mixed acetal resin is one containing, on a weight basis, 13% hydroxyl groups calculated as polyvinyl alcohol, 2 to 6% acetate groups calculated as polyvinyl acetate and the balance 65–50 mol per cent acetaldehyde acetal and 35–50 mol per cent butyraldehyde acetal.

The partial esters employed according to this invention are non-resinous polyhydric alcohol partial esters, the polyhydric alcohol residues thereof containing at least one free hydroxyl group, made with poly-unsaturated aliphatic acids. The polyhydric alcohols from which these esters may be made are non-resinous polyhydric alcohols, particularly low molecular weight polyhydric alcohols containing not over 10 carbon atoms, such as glycerin, mannitol, sorbitol, glucose, erythritol, pentaerythritol, glycols such as ethylene glycol, propylene glycols, diethylene glycol, triethylene glycol, tetraethylene glycol, pentaethylene glycol and the like. Examples of poly-unsaturated aliphatic acids which may be employed in preparing the partial esters are polyolefinic unsaturated aliphatic acids, for example, diolefinic unsaturated aliphatic acids such as 2,4-pentadienoic acid, 2,4-hexadienoic acid, 3,7-dimethyl-2,6-octadienoic acid, 9,12-octadecadienoic acid, dehydrated castor oil acids, e. g. "Isoline" acids; triolefinic unsaturated aliphatic acids such as 3,7-dimethyl-2,4,6-octatrienoic acid, 9,12,15-octadecatrienoic acid, 9,11,13-octadecatrienoic acid.

Mixtures of polyhydric alcohol partial esters of poly-unsaturated aliphatic acids may be employed and when desired, mixtures of these unsaturated esters with polyhydric alcohol partial esters of saturated aliphatic acids or mono-olefinic acids as for example, esters derived from mixtures of acids occurring in various drying and semi-drying oils, as for example, linseed, tung, soya bean, perilla, sunflower, safflower, poppy seed, walnut and dehydrated castor oils in which at least 25% of the acids are poly-olefinic. Particularly preferred are the oil acids containing 50% or more of poly-olefinic acids. The acids derived from these oils consist predominantly of poly-unsaturated acids containing 18 carbon atoms. For certain purposes, partial esters may be used which are made of the mixture of acids occurring in oils such as sesame oil, corn oil, cotton seed oil and the like, which mixtures of acids contain substantial amounts, i. e., at least 25%, of poly-unsaturated acids such as those mentioned above, but do not predominate therein.

Mixed esters may be employed in which at least 25% and preferably 50% of the acid residues are poly-unsaturated, for example, glyceryl diesters in which one acid residue is derived from 9,12-octadecadienoic acid, and one from 9-octadecenoic acid.

According to a particular embodiment of this invention, the esters employed are glyceryl monoesters of the mixed acids present in the oils mentioned above, or of the individual poly-unsaturated acids therein, such as glyceryl mono-9,12-octadecadienoate, glyceryl mono-9,12,15-octadecatrienoate, glyceryl monoester of "Isoline" acids and the like. Especially valuable products are obtained by using monoesters of poly-unsaturated acids and glycerin which have iodine value of at least 180, e. g., the glyceryl monoesters of linseed oil acids, "Isoline" acids, perilla oil acids, 9,12,15-octadecadienoic acid and the like.

Usually the proportion of sulfur employed is less than 50 parts for every 100 parts of polyvinyl acetal resin. Thus, particularly outstanding results are obtained when 0.05–30 parts of sulfur are used for every 100 parts of polyvinyl acetal resin.

In general, at least about 25 and preferably not over about 150 parts of the partial esters are employed for every 100 parts of polyvinyl acetal resin. For many purposes, a partial ester content of 45–100 parts produces particularly noteworthy products. When desired, other plasticizers may be used along with the partial esters, as for example, butyl ricinoleate, dibutyl sebacate, triethylene glycol dihexoate, dibutyl phthalate and the like, in proportions that are usually in the range of 10–40 parts per 100 parts of polyvinyl acetal resin.

In place of phenol-aldehyde resins, other alkylol group-containing aldehyde condensation or addition products, such as aminotriazine aldehyde, specifically melamine-formaldehyde, urea-aldehyde, dicyandiamide-aldehyde condensation products and the like may be used. The substances with which the aldehydes are condensed to form the alkylol-group-containing condensation products have at least two aldehyde-replaceable hydrogen atoms. Examples of phenols that may be used include phenol, ortho-cresol, para-cresol, para-tertiary butyl phenol, para-tertiary amyl phenol, para-phenyl phenol, phenyl ethyl phenol prepared by reacting styrene with phenol, phenyl propyl phenol prepared by reacting alpha-methyl styrene with phenol, and the like. In addition to melamine, other amino-triazines containing two or more aldehyde-replaceable hydrogen atoms may be used, such as ammeline. In place of formaldehyde, other aldehydes may be used, such as acetaldehyde, propionaldehyde, benzaldehyde, crotonaldehyde, acrolein and the like.

The inclusion of aldehyde condensation products such as those mentioned above is found to reduce the weight loss of the composition on heating and to produce compositions with increased tensile strengths and percentages of elongation, as illustrated by the results set forth in Examples VI and VII. The proportion of aldehyde condensation products may be substantially varied, for example, 2–50 parts, and particularly, 3–15 parts, may be used for every 100 parts of polyvinyl acetal resin.

Various other modifying materials may be used to impart the specic modifications and characteristics of the products set forth hereinbefore. For example, metallic oxides such as zinc oxide, megnesium oxide and tin oxide and the like may be included in amounts ranging from 5–30 parts per 100 parts of polyvinyl acetal resin. Such compositions are found to cure extremely rapidly on heating to 100° C. and above, to form tough, rubbery, abrasion - resistant products.

The compositions of this invention may be formed into sheets or other articles by the application of pressure with or without a certain amount of heating, or may be used for coating such materials as cloth, paper, wood, metal, concrete or the like. Cloth, for example, may be advantageously coated or impregnated by calendering or by applying a solution of the composition and then evaporating the solvent. When advantageous, fillers may be included such as carbon black, whiting and the like.

When applying the compositions of the invention by methods such as those given above, at raised temperatures, care is taken to avoid prematurely converting the compositions to the infusible, insoluble state; thus, temperatures below about 100° C. are generally used. Thereafter, the compositions may be cured by raising the temperature, for example, to 130–140° C. to form insoluble, infusible, tough, elastic materials.

It is to be understood that the above description is given by way of illustration only, and not of limitation, and that deviations are possible within the spirit of the invention.

What is claimed is:

1. A composition comprising a polyvinyl acetal resin derived from a polyvinyl ester in which at least 30% of the ester groups have been replaced by acetal groups and not more than 50% of the ester groups have been replaced by hydroxyl groups, 25–150 parts of a partial ester of a nonresinous polyhydric alcohol and a poly-unsaturated aliphatic acid, the polyhydric alcohol residue of said ester containing at least one free hydroxyl group, and 0.05–30 parts of sulfur for every 100 parts of polyvinyl acetal resin.

2. A composition comprising a polyvinyl acetal resin derived from a polyvinyl ester in which at least 30% of the ester groups have been replaced by acetal groups and not more than 50% of the ester groups have been replaced by hydroxyl groups, 25–150 parts of a glyceryl monoester of a poly-unsaturated aliphatic acid, the acid residue thereof containing more than 9 but less than 21 carbon atoms, and 0.05–30 parts of sulfur for every 100 parts of polyvinyl acetal resin.

3. A composition as defined in claim 2 in which the polyvinyl acetal resin is a polyvinyl butyraldehyde acetal resin.

4. A composition as defined in claim 2 in which the polyvinyl acetal resin contains on a weight basis, 5–25% hydroxyl groups calculated as polyvinyl alcohol.

5. A composition as defined in claim 2 in which the polyvinyl acetal resin is a polyvinyl butyraldehyde acetal resin containing, on a weight basis, 5–25% hydroxyl groups calculated as polyvinyl alcohol.

6. A composition comprising a polyvinyl butyraldehyde acetal resin containing, on a weight basis, 5–25% hydroxyl groups calculated as polyvinyl alcohol, up to 30% ester groups calculated as polyvinyl ester and the balance substantially butyral groups, 25–150 parts of a glyceryl monoester of a poly-olefinic acid, the acid residue thereof containing more than 16 but less than 20 carbon atoms and 0.05–30 parts of sulfur for every 100 parts of polyvinyl acetal resin.

7. A composition as defined in claim 2 in which the polyvinyl acetal resin is a polyvinyl butyraldehyde acetal resin containing 10–20% hydroxyl groups on a weight basis calculated as polyvinyl alcohol.

8. A composition as defined in claim 6 in which the polyvinyl acetal resin contains 10–20% hydroxyl groups on a weight basis, calculated as polyvinyl alcohol.

9. A composition as defined in claim 1 in which 0.3–10 parts of sulfur are present for every 100 parts of polyvinyl acetal resin.

10. A composition comprising a polyvinyl acetal resin containing, on a weight basis, 5–25% hydroxyl groups calculated as polyvinyl alcohol, up to 30% ester groups calculated as polyvinyl ester and the balance substantially acetal groups, 25–150 parts of a glyceryl monoester of a poly-olefinic acid, the acid residue thereof containing more than 9 but less than 21 carbon atoms and 0.3–10 parts of sulfur for every 100 parts of polyvinyl acetal resin.

11. A composition as defined in claim 6 in which 0.3–10 parts of sulfur are present for every 100 parts of polyvinyl acetal resin.

12. A composition comprising a polyvinyl butyraldehyde acetal resin containing, on a weight basis, 10–20% hydroxyl groups calculated as polyvinyl alcohol, up to 30% ester groups calculated as polyvinyl ester and the balance substantially butyral groups, 25–150 parts of a glyceryl monoester of a poly-unsaturated aliphatic acid, the acid residue thereof containing more than 9 but less than 21 carbon atoms and 0.3–10 parts of sulfur for every 100 parts of polyvinyl acetal resin.

13. A composition comprising 100 parts of polyvinyl butyral acetal resin containing, on a weight basis, 10–20% hydroxyl groups calculated as polyvinyl alcohol, up to 30% ester groups calculated as polyvinyl ester and the balance substantially butyral groups, 25–150 parts of a monoester of glycerine and linseed oil acids and 0.05–30 parts of sulfur.

14. A composition comprising 100 parts of polyvinyl butyral acetal resin containing, on a weight basis, 10–20% hydroxyl groups calculated as polyvinyl alcohol, up to 30% ester groups calculated as polyvinyl ester and the balance substantially butyral groups, 25–150 parts of a monoester of glycerine and soy bean oil acids and 0.05–30 parts of sulfur.

15. A composition comprising 100 parts of polyvinyl butyral acetal resin containing, on a weight basis, 10–20% hydroxyl groups calculated as polyvinyl alcohol, up to 30% ester groups calculated as polyvinyl ester and the balance substantially butyral groups, 25–150 parts of monoester of glycerine and dehydrated castor oil acids and 0.05–30 parts of sulfur.

16. A composition comprising 100 parts of polyvinyl butyral acetal resin containing, on a weight basis, 10–20% hydroxyl groups calculated as polyvinyl alcohol, up to 30% ester groups calculated as polyvinyl ester and the balance substantially butyral groups, 45–100 parts of a monoester of glycerine and linseed oil acids and 0.3–10 parts of sulfur.

17. A composition comprising 100 parts of polyvinyl butyral acetal resin containing, on a weight basis, 10–20% hydroxyl groups calculated as polyvinyl alcohol, up to 30% ester groups calculated as polyvinyl ester and the balance substantially butyral groups, 45–100 parts of a monoester of glycerine and soy bean oil acids and 0.3–10 parts of sulfur.

18. A composition comprising 100 parts of polyvinyl butyral acetal resin containing, on a weight basis, 10–20% hydroxyl groups calculated as polyvinyl alcohol, up to 30% ester groups calculated as polyvinyl ester and the balance substantially butyral groups, 45–100 parts of a monoester of glycerine and dehydrated castor oil acids and 0.3–10 parts of sulfur.

MAX O. DEBACHER.

REFERENCES CITED

The following references are of record in the file of this patent:

UNITED STATES PATENTS

| Number | Name | Date |
| --- | --- | --- |
| 2,386,534 | Barsky | Oct. 9, 1945 |